United States Patent [19]
Upton

[11] Patent Number: 6,052,475
[45] Date of Patent: *Apr. 18, 2000

[54] FINGERPRINT DETECTOR USING RIDGE RESISTANCE SENSING ARRAY

[75] Inventor: Eric L. Upton, Redondo Beach, Calif.

[73] Assignee: TRW Inc., Redondo Beach, Calif.

[*] Notice: This patent is subject to a terminal disclaimer.

[21] Appl. No.: 08/906,604

[22] Filed: Aug. 4, 1997

Related U.S. Application Data

[63] Continuation of application No. 08/412,637, Mar. 29, 1995, abandoned.

[51] Int. Cl.$^7$ .................................................. G06K 9/00
[52] U.S. Cl. .............................. 382/125; 283/69; 396/15
[58] Field of Search .................................. 382/115, 124, 382/125, 126, 127, 116, 120, 122, 218; 340/825.3; 345/174; 396/15; 283/69, 78

[56] References Cited

U.S. PATENT DOCUMENTS

| | | | |
|---|---|---|---|
| 3,639,905 | 2/1972 | Yaida et al. | 340/149 |
| 3,781,855 | 12/1973 | Killen | 340/146.3 |
| 4,429,413 | 1/1984 | Edwards | 382/4 |
| 4,582,985 | 4/1986 | Löfberg | 235/380 |
| 4,699,149 | 10/1987 | Rice | 128/664 |
| 4,784,484 | 11/1988 | Jensen | 356/71 |
| 4,933,976 | 6/1990 | Fishbine et al. | 382/127 |
| 4,983,036 | 1/1991 | Froelich | 356/71 |
| 5,079,949 | 1/1992 | Tamori | 73/172 |
| 5,088,817 | 2/1992 | Igaki et al. | 356/71 |
| 5,195,145 | 3/1993 | Backus et al. | 382/4 |
| 5,258,922 | 11/1993 | Grill | 364/506 |
| 5,267,324 | 11/1993 | Kumagai | 382/4 |
| 5,325,442 | 6/1994 | Knapp | 382/4 |
| 5,373,181 | 12/1994 | Scheiter et al. | 257/415 |
| 5,400,662 | 3/1995 | Tamori | 73/862.046 |
| 5,546,471 | 8/1996 | Merjanian | 382/115 |
| 5,559,504 | 9/1996 | Itsumi et al. | 382/115 |
| 5,864,296 | 1/1999 | Upton | 340/825.3 |

FOREIGN PATENT DOCUMENTS

WO 94/25938   11/1994   WIPO.

*Primary Examiner*—Jon Chang
*Assistant Examiner*—Jayanti K. Patel
*Attorney, Agent, or Firm*—Michael S. Yatsko

[57] ABSTRACT

A fingerprint detector that uses a skin resistance sensing array for producing a sample trajectory signal when a fingertip is moved across the sensing array surface. The sample trajectory signal represents the electrical conductance changes in the resistance of ridges and valleys of the fingertip. The fingerprint detector also includes a sampling circuit coupled to a processor. In addition, a technique is disclosed for detecting and verifying a fingerprint by moving a fingertip relative to the skin resistance sensing array. The sample trajectory signal produced is translated into a digital signal by the sampling circuit. The processor receives the digital sample trajectory signal for comparison with a known reference trajectory signal. The processor produces a verification signal if a threshold probability that the same fingertip generated both signals is exceeded. The reference trajectory signal is stored in a memory integrated into the device, or is provided from an external storage device through a data interface.

20 Claims, 3 Drawing Sheets

FINGERPRINT DETECTOR USING RIDGE RESISTANCE SENSING ARRAY

This application is a continuation of U.S. patent application Ser. No. 08/412,637, filed Mar. 29, 1995 now abandoned.

BACKGROUND OF THE INVENTION

1. Technical Field

The present invention relates to fingerprint detection devices, and more particularly to electronic fingerprint detection devices for sensing the unique surface topography of a fingerprint.

2. Discussion

Fingerprint detection devices are utilized in many applications requiring an extremely high probability of positive recognition of persons seeking access to secured areas, at customs and border inspections, and where it is essential to verify that the correct person is involved in the transaction. Other forms of identification have been implemented to verify the correctness of a specific person including photographic identification, signature verification, and personal identification numbers (PIN). Problematically, the latter of these schemes fail to uniquely identify an individual with the same level of assurance as an individual's fingerprints. All of the above-mentioned forms of identification are extremely susceptible to fraudulent modification. The likelihood of two sets of fingerprints being the same is so remote that law enforcement agencies use fingerprints with high confidence to positively identify individuals. Real time fingerprint detection devices have been implemented for high probability identification, but many limitations still exist. The associated costs currently make large scale distribution of these devices impossible.

Currently, fingerprint detection devices employ some form of imaging system to scan the unique characteristics of a fingerprint which are then compared to those same characteristics of a known reference fingerprint. Typically these imaging systems consist of thermal or optical sensors for translating fingerprint line information into digital wave forms that can be analyzed by a microprocessor. Further, these imaging components require complex optics, lasers or electronic circuits which are expensive to manufacture. Therefore the devices in which they operate are expensive and typically have limited portability. They also require complex image processors to implement the fingerprint detection algorithms. To operate these conventional devices, the fingerprint is placed upon the imaging surface, and remains stationary while the device electronically scans or optically images the fingerprint line characteristic information. This often involves arrays as large as 256×512 sensing elements making the integrated sensor expensive and vulnerable since it must come in contact with the finger. These complex arrays produce a large number of data points that must be processed and ultimately stored for reference. In addition they are highly susceptible to dirt and oils contained within their operating environment. Some arrays also require a complicated registration system for detecting the position or relative center of the fingerprint and establishing reference points before scanning the fingertip and processing its characteristics against a known reference.

An exemplary approach is disclosed in U.S. Pat. No. 4,582,985 to Löfberg entitled "Data Carrier" which discloses a fingerprint verification system fabricated into a device approximately the size of a credit card. The device includes a memory used to store a previously obtained reference bit sequence. The fingerprint to be detected is placed upon an imaging device consisting of thermal or optical sensing elements for translating fingerprint line information into a digital bit sequence. The digital signal is then compared to a reference bit sequence by a microprocessor. If the comparison process achieves a match within a certain degree of coincidence, a positive detection signal is produced. However, as noted above, this approach accomplishes fingerprint verification by using a sensing array with a large number of sensing elements. This complex array is expensive to fabricate, produces large volumes of data to process, and is easily damaged by excessive force. It further requires a registration means for detecting the position of the stationary fingertip, thereby increasing the complexity of the circuitry and requiring additional data processing capabilities.

Thus it would be desirable to provide a fingerprint detector employing a sensing array with a small number of sensing elements, thereby simplifying the data processing requirements by reducing the quantity of data to be analyzed and lowering overall power consumption permitting battery operated devices. In addition, it would be desirable to provide a fingerprint detection device which utilizes an electronic sensor allowing the electronics to be implemented within a single integrated circuit to reduce cost and eliminate exotic imaging technologies. These features enable manufacturing a cost effective device for large scale implementation in both industrial and consumer applications. Furthermore, it is desirable to provide a sensor which produces an electronic signal with high signal-to-noise ratio and high dynamic range, thereby significantly reducing the probability of error.

SUMMARY OF THE INVENTION

Pursuant to the present invention, a low cost fingerprint detector using a skin resistance sensing array is disclosed. The comparative simplicity of the sensing array including its supporting circuitry, allow the device to be manufactured within a data carrier card, preferably the size of a credit card carried by the user. In addition, a technique is disclosed for detecting and verifying a fingerprint by moving a fingertip relative to the skin resistance sensing array, processing the related fingertip signal information, and producing a verification signal. The result is numerous improvements over existing devices and methods for detecting and verifying fingerprints.

In accordance with the teachings of one embodiment of this invention, a fingerprint detector is provided which includes a skin resistance sensing array for translating skin resistance of a fingertip into a sample trajectory signal. The sample trajectory signal corresponds to conductance changes in the skin resistance which is a function of ridges and valleys of the fingertip, as it is moved across the sensing array surface. The sensing array includes at least one sensor positioned for contacting a fingertip and allowing relative movement between the fingertip and the sensor. The sensing array is coupled to a sampling circuit which translates the sample trajectory signal into a digital signal. The fingerprint detector further includes a processor to receive the digital sample trajectory signal, compare it with a reference trajectory signal and execute a verification algorithm.

Also in accordance with the teachings of this invention, a method is provided for detecting and verifying a fingerprint by moving a fingertip relative to a skin resistance sensing array. The sensing array translates the skin resistance of the fingertip into a sample trajectory signal. A sampling circuit is provided for digitizing and normalizing the sample trajectory signal. Next, the sample trajectory signal is statistically correlated with a previously stored reference trajectory signal. A verification signal is then produced if the threshold probability that the fingertip generated both the sample trajectory signal and the reference trajectory signal is exceeded.

BRIEF DESCRIPTION OF THE DRAWINGS

Other objectives and advantages of the present invention will become apparent to those skilled in the art upon reading the following detailed description and upon reference to the drawings, in which.

DETAILED DESCRIPTION OF THE PREFERRED EMBODIMENT

The following description of the preferred embodiment is merely exemplary in nature and is in no way intended to limit the invention or its application or uses.

The present invention is particularly concerned with a device for detecting and verifying a fingerprint using a ridge resistance sensing array along with a technique for moving a fingertip across the sensing array surface and processing the resulting electrical signal. The simplicity of the array along with the technique for swiping the finger across the array, allow for a low cost signal processing system to be implemented and fabricated into a single integrated circuit package. The resulting low cost chip may then be integrated into other devices such as, but not limited to, credit cards, door locks, point of sale terminals, and computer terminal keyboards, as a means for identification or security.

The invention is described in detail with reference to a fingerprint detection system integrated into a credit card which is intended to be illustrative of the concept. It will be appreciated by those skilled in the art that the present invention, as defined by the appended claims, has many other applications other than the illustrative embodiments. Furthermore, the invention is described with reference to the fingerprint detector being fabricated into a single integrated circuit, however, it will be appreciated by those skilled in the art that a fingerprint detector system assembled from discrete electronic components is within the scope of the present invention.

Figure 1:
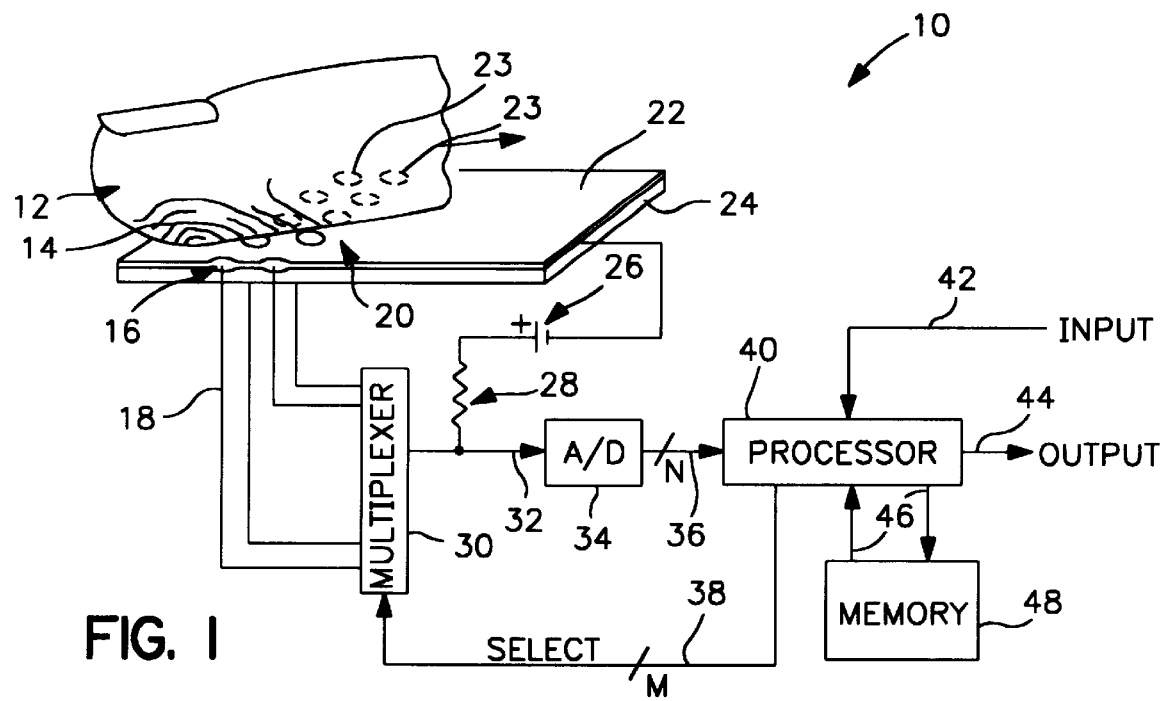
FIG. 1 is a functional schematic of the fingerprint detection system in accordance with the present invention.

Turning now to FIG. 1, a fingerprint detector 10 is shown by way of a functional schematic diagram. The fingerprint detector 10 includes a skin resistance sensing array 20 which further includes ten sensing elements 16 forming a 2×5 array. The sensing elements 16 are aligned as rows and columns. The rows are spaced at a predetermined distance, which allow a fingertip velocity function to be measured. Sensing array 20 is constructed by forming a conducting layer 22 upon an insulating layer 24 which may also serve as a supporting structure for the device. Additionally, conducting layer 22 and sensing elements 16 form the top surface of the skin resistance sensing array 20 across which the fingertip 12 is drawn. Conducting layer 22 also includes a plurality of holes 23 aligned in a 2×5 array. Each sensing element 16 is formed where a corresponding conducting layer hole 23 exposes an annular portion of the insulating layer 24 that in turn encompasses one conducting wire 18. These features can also be seen in FIG. 4. Each conducting wire 18 extends downwardly from the sensing element 16 surface, and into the insulating layer 24. The conducting wires 18 may extend completely through the insulating layer 24 and terminate at the input connections of multiplexer 30. In an alternative embodiment, conducting wires may form traces that extend through the insulating layer 24 which forms the integrated circuit (IC) packaging and connect to an integrated multiplexing circuit within the monolithic package. The traces may also run through the body of the data carrier card 50 before connecting to sampling circuit 56.

Figure 2:
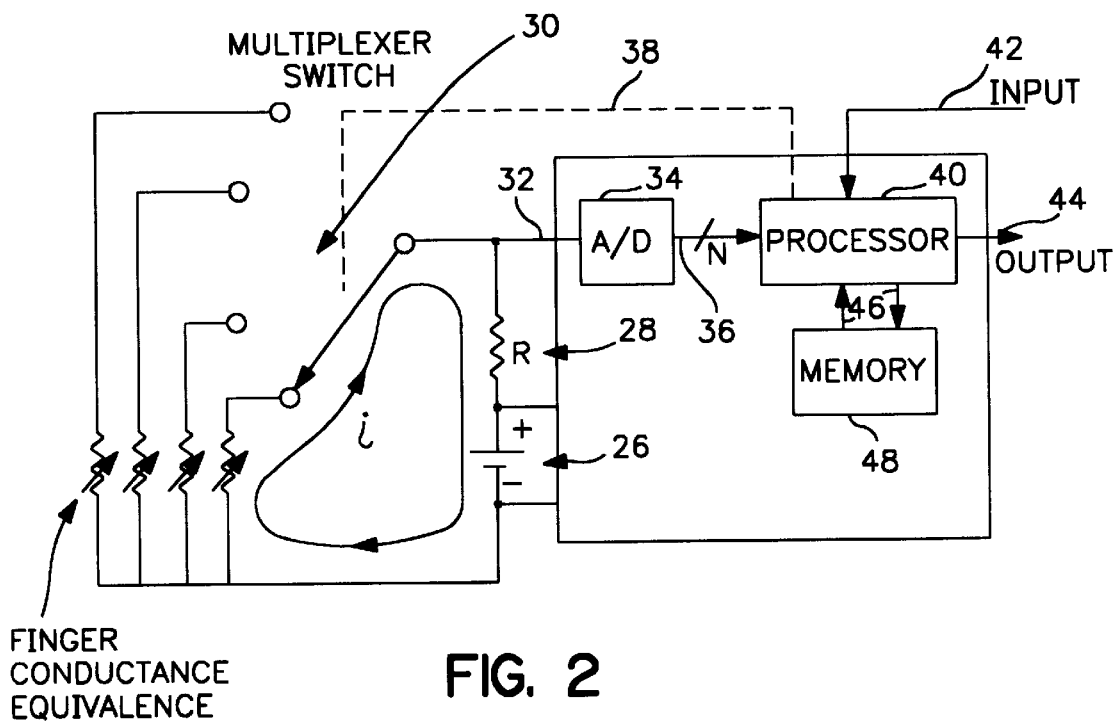
FIG. 2 is a schematic which illustrates an equivalent circuit of the fingerprint detection system.

As depicted in FIGS. 1 and 2 sensing array 20 further includes components that form a resistive voltage divider circuit. However it will become apparent to one skilled in the art that this circuit is not limited to a resistive voltage divider, and other circuits suitable for measuring the resistance characteristic of skin are embodied within the scope of the present invention. A first resistor 28 is connected to the positive terminal of a voltage supply 26. The negative terminal of the voltage supply 26 is connected to conducting layer 22. Each of the ten conducting wires 18 is connected to an input terminal of a multiplexer 30, which is modeled as a short circuit switching device (FIG. 2) which selectively completes the circuit through to first resistor 28. Referring to FIG. 2, the multiplexer 30 is then selectively switched by a processor 40 through select lines 38 in a continuous one through ten sequence. As can be most clearly seen in FIG. 4 the voltage divider circuit formed by the sensing array 20 is completed when a fingertip ridge 60 of fingerprint 14 forms a second variable resistor connecting conducting layer 22 with a conducting wire 18. Fingertip ridges 60 behave like variable resistors, and fingertip valleys 62 behave like open circuits.

The voltage drop across fingertip ridge 60 creates the sample trajectory signal, which represents the resistive characteristic of human skin. Each sample trajectory signal is produced by the continuous curvalinear trajectory formed by fingertip ridges 60 and valleys 62, as traced by a sensing element 16, and represents electrical conductance changes in the skin resistance of the fingertip 12. The resulting analog sample trajectory signal is sampled by analog to digital converter 34 at input 32 which translates the analog signal into a digital bit stream. The output of A/D converter 34 consists of N bit data lines 36 coupled to processor 40 which allow transmission of the digital sample trajectory signal. Processor 40 further includes verification output 44 for providing a verification signal. Processor 40 may optionally include a processor input 42 for allowing data transmission through data interface 54 from an external storage device. Input 42 allows for an externally stored reference trajectory signal to be received by processor 40 for real time comparison with the sample trajectory signal. Alternatively, if a data interface 54 is not provided, processor 40 may be directly coupled to a memory 48 through memory interface 46. Memory 48 is selectively programmable with the user's reference trajectory signal information. Memory 48 may be either a random access memory (RAM) or a read only memory (ROM).

Multiplexer 30 and A/D converter 34 along with their supporting components form sampling circuit 56 which may exist as discrete components, or may alternatively be combined into a monolithic integrated circuit package. Sampling circuit 56 currently exists as an industry standard product such as that manufactured by Maxim Corporation under part number MAX186AEWP. In the preferred embodiment, processor 40 is a digital signal processor (DSP) with the capability to perform statistical correlations of two or more digital signals. Processor 40 is currently available as an industry standard DSP manufactured by Texas Instruments as part of the TMS320 family of signal processors.

Figure 3:
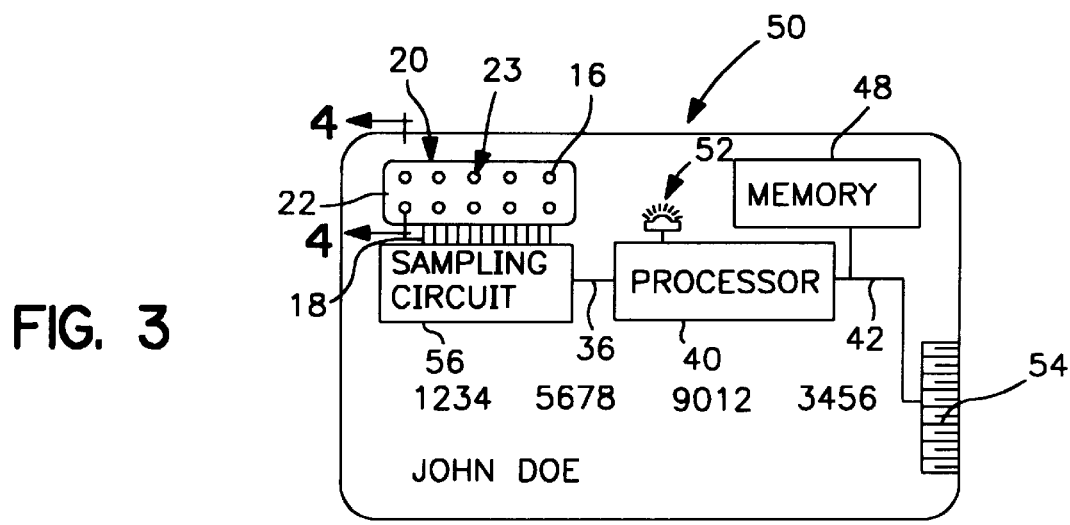
FIG. 3 is a schematic of the fingerprint detector fabricated into a data carrier card in accordance with the present invention.
Figure 7:
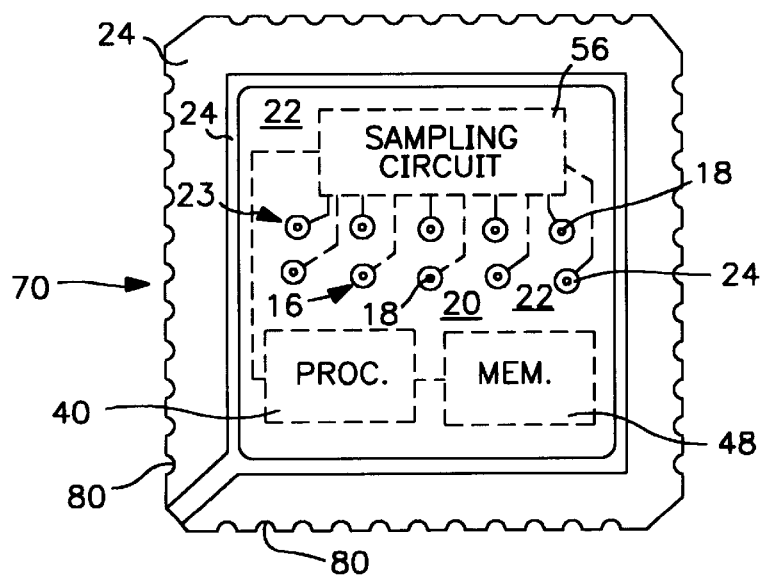
FIG. 7 illustrates the sensing array, sampling circuit, processor and memory fabricated into a single integrated circuit package with the array of conducting wires embedded into the top surface.
Figure 8:
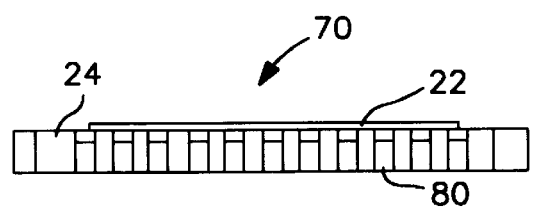
FIG. 8 illustrates a side view of the integrated circuit package of FIG. 7 with side mounted connecting wires.

Turning now to FIG. 3, an exemplary data carrier card 50 is depicted along with a functional block diagram of fingerprint detector 10. Sensing array 20 is flushly mounted within the surface of data carrier 50. Conducting layer 22 is formed upon the surface of sensing array 20 along with insulating layer 24 and conducting wires 18 flushly exposed at the surface. Conducting wires 18 extend from the surface of sensing array 20 down into the body of data carrier card 50 where they then connect to sampling circuit 56. In the preferred embodiment, sensing array 20, sampling circuit 56, processor 40, and optionally, memory 48 are integrated into a single integrated circuit package 70 as best illustrated in FIGS. 7 and 8. In the preferred embodiment, conducting wires 18 connect to sampling circuit 56 internally through IC package 70. Returning to FIG. 3, data carrier 50 further includes a verification transducer 52 connected to processor 40 which may produce either a visible or audible signal. The data carrier card 50 shown in FIG. 3 also includes an optional data interface 54. The functional block diagram illustrates sampling circuit 56 connected by data lines 36 to processor 40, which is further connected to memory 48. It should be noted that memory 48 and data interface 54 are optional elements. Data interface 54 is not required if fingerprint detector includes a memory 48. However, an alternative embodiment of data carrier 50 may include both a memory 48 and a data interface 54.

Figure 4:
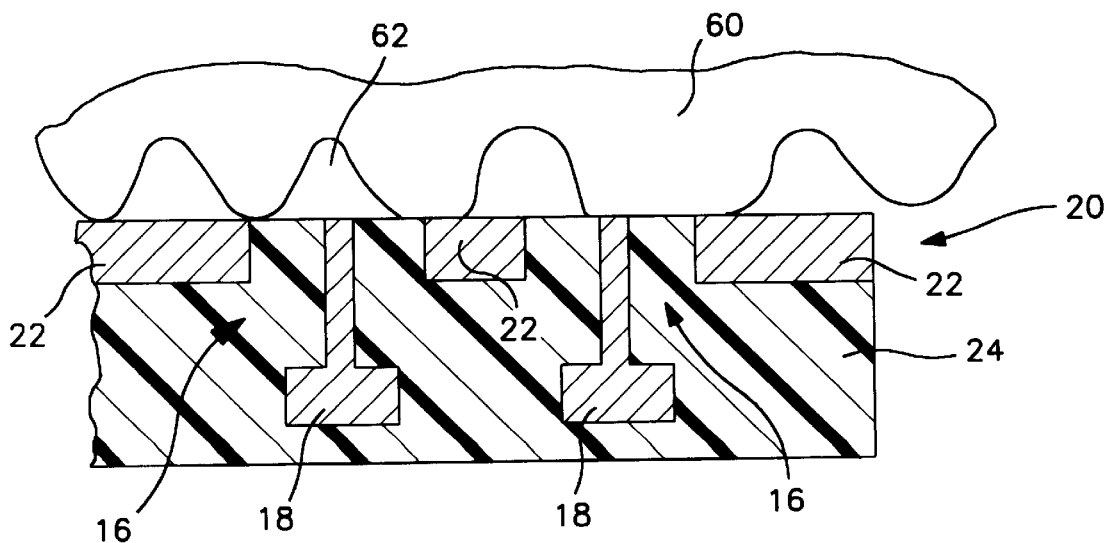
FIG. 4 is a sectional view of a representative skin resistance sensing array taken along line 4—4 of FIG. 3.

Turning now to FIG. 4, a cross-sectional view of sensing array 20 is taken along sectional 4—4. The figure illustrates insulating layer 24 with conducting layer 22 formed thereon. In this embodiment, insulating layer 24 may take the form of, but not limited to, the body of data carrier card 50 or the packaging material of an integrated circuit, so long as these materials possesses the requisite insulating qualities. It should be particularly noted that an annular portion of insulating layer 24 is exposed by conducting layer holes 23 at each sensing element 16 location. Conducting wires 18 are then fabricated into insulating layer 24 and extend flushly from each sensing element 16 surface down into insulating layer 24 where they connect to multiplexer 30. The figure illustrates that each conducting wire 18 is small enough in diameter that a fingertip valley 62 can pass over a conducting wire 18 without completing the circuit to conducting layer 22. However, each conducting wire 18 must also be large enough to contact a fingertip ridge 60 to complete a circuit through the ridge 60 to conducting layer 22.

Figure 5:
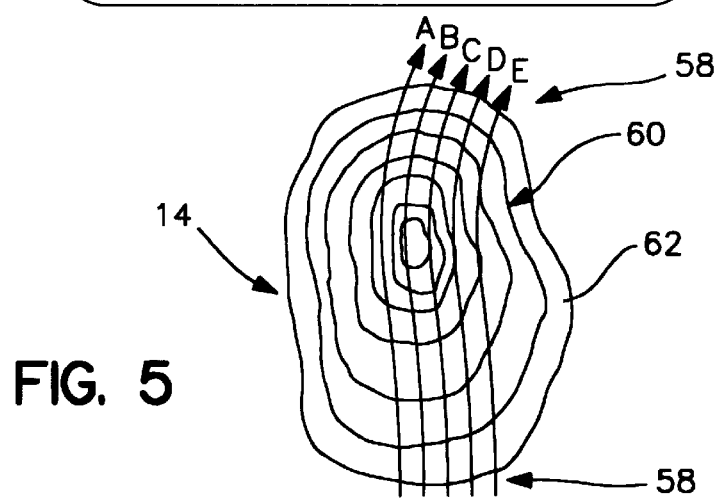
FIG. 5 illustrates a representative fingerprint and the arbitrary path or trajectory taken by a fingerprint being moved across five sensing elements.

Turning now to FIG. 5, an exemplary fingerprint 14 of a fingertip is depicted comprising fingertip ridges 60 and fingertip valleys 62. Also illustrated in this figure is an exemplary sensing array path 58 traced across a fingerprint 14 surface as fingertip 12 is drawn across the sensing array 20. Sensing array 20 may trace any path across fingerprint 14 so long as the path extends the full length of fingerprint 14 through the approximate center in a continuous manner. The path followed by each sensing element 16 along sensing array path 58 produces a sample trajectory signal representing the unique topography of the individual's fingertip.

Figure 6:
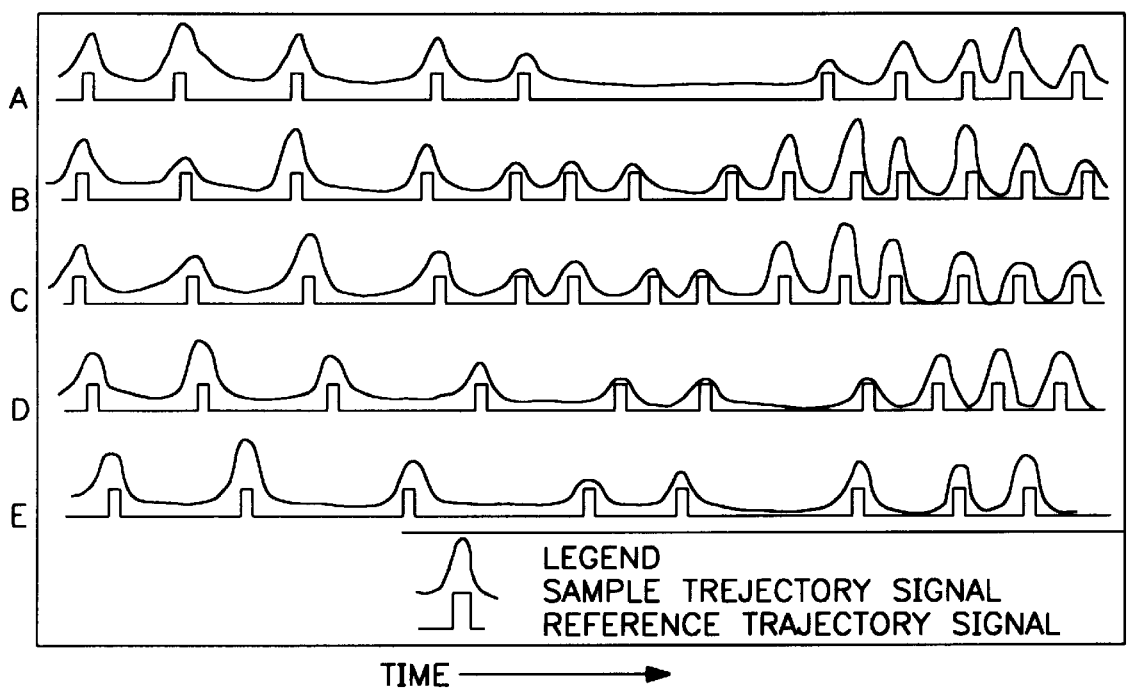
FIG. 6 is a graph of five sample trajectory signals (A–E) produced at each sensor output over time, representing the conductance changes between fingerprint ridges and valleys, and compared with positions of the reference fingerprint data if their respective functions were matched.

Turning now to FIG. 6, a graph illustrates five sample trajectory signals measured at each sensor element 16. The graph illustrates each sample trajectory signal which is defined as a continuous curvalinear voltage function measured over time. The graph further corresponds to the exemplary sensing array path 58 as depicted in FIG. 5. Each sample trajectory signal A through E on FIG. 6 directly corresponds to a sensing array path 58 line A through E as illustrated in FIG. 5. It should be noted that each peak within the sample trajectory signals A through E graphed in FIG. 6 represents a fingertip ridge 60 as the ridge 60 completes a circuit through each sensing element 16. The sample trajectory signal is quantized into a digital signal, and correlated with the stored reference trajectory signal. The graph also illustrates five reference trajectory signals with fingertip ridge 60 positions that match those of the sample trajectory signals. Comparing FIG. 5 with FIG. 6, it should be noted that the intersection of each fingerprint ridge 60 with each sensing array path 58 line A through E (FIG. 5) as each of the five sensing elements 16 is drawn in the direction of the arrows across fingerprint 14 directly correspond to the sample trajectory signal peaks graphed over time as illustrated in FIG. 6.

Referring now to FIG. 7, a complete fingerprint detector 10 is disclosed as fabricated into a single integrated circuit package 70. The chip is preferably small enough to further allow integration into a data carrier card 50. The primary dimension of concern is the thickness of the chip packaging. A variety of monolithic integrated circuits are available in this standard C2 Package—44 Contact Hermetic Ceramic Chip Carrier available from TRW Inc. The standard package illustrated can be manufactured to a minimum thickness of 1.62 mm, however, future advances in manufacturing technology will likely allow this dimension to be reduced. FIG. 7 is a top view of integrated circuit package 70 which is typically manufactured from ceramic, epoxy resin, or a similar material which is suitable as an insulating layer 24. Conducting layer 22 is formed on the top surface of insulating layer 24, which then becomes part of IC package 70. Conducting layer holes 23 are formed at each predetermined sensing element 16 location to expose a conducting wire 18 as well as an annular section of insulating layer 24 that surrounds each conducting wire 18. The figure further indicates the importance of each conducting layer hole 23 centered around its respective conducting wire 18 which creates an insulating region formed by the exposed insulating layer 24 between the conducting layer 22 and the conducting wire 18. Each conducting wire 18 is exposed at the surface of integrated circuit package 70 and extends down through the packaging to connect with sampling circuit 56. In addition, FIG. 7 illustrates integrated circuit package 70 and a block diagram of the functions contained within the monolithic circuit. The low complexity of sensing array 20 is the primary feature which allows fingerprint detector 10 to be fabricated into a single monolithic chip.

FIG. 8 is a side view of integrated circuit package 70. It can also be seen from this illustration that conducting layer 22 is formed upon insulating layer 24 which further serves as the primary packaging material. The figure illustrates the positioning of connection pins 80 along the sides of IC package 70 which allow connection between the chip and external circuitry. It should be particularly noted that side mounted connection pins 80 further allow integrated circuit package 70 to maintain a low profile.

The method for detecting and verifying a fingerprint according to the teachings of this invention will now be described. An algorithm provides the decision as to whether the user's fingerprint data matches the stored reference data. The technique includes providing a fingerprint detector 10 with an exposed skin resistance sensing array 20 which allows the fingerprint 14 of fingertip 12 to be drawn in contact across sensing array 20 in a continuous manner. Immediately upon sensing contact of the fingertip 12 with the sensing array 20, the circuitry within the fingerprint detector 10 is automatically activated. It will be appreciated by one skilled in the art that automatic activation may be achieved by sensing surface pressure or electrical current through the device. The sensing array path 58 in which sensing array 20 is traced across the surface of fingerprint 14 is not dependent upon the alignment or rate in which fingerprint 14 is drawn across the sensing array 20. The only requirement for producing an acceptable sample trajectory signal is that fingerprint 14 must be drawn across sensing array 20 from end to end through the relative center of the fingerprint in a smooth continuous motion. The continuous motion of fingerprint 14 across sensing array 20 produces a continuous sample trajectory signal, as illustrated in FIG. 6. The resulting signal is typically of high signal-to-noise ratio and also covers a broad dynamic range. Both of these signal characteristics significantly reduce the probability of error contained within the statistical correlation algorithm. The analog sample trajectory signal is then quantized into a digital bit stream by A/D converter 34 (FIG. 1) that can be statistically correlated with a stored reference trajectory signal that is a record of the individual's fingertip ridges and valleys, by a digital signal processor 40 (FIG. 6). Monolithic digital signal processors that perform the necessary statistical correlation algorithm are currently available as standard off the shelf devices. The flexible architecture allows the reference trajectory signal to be stored in a memory 48, preferably a read only memory (ROM). Alternatively, the reference trajectory signal may be retrieved from an external storage device through data interface 54 before being processed.

The algorithm is flexible in that it allows the two signals to be compared in real time by the processor 40, or the digital bit stream representing the sample trajectory signal can be completely stored in a memory 48 and processed off-line by the processor 40. The algorithm executed by the processor seeks to maintain a minimum position hypothesis error between the sample trajectory signal and the reference trajectory signal. A statistical correlation is performed over all hypothetical degrees of freedom relative to the last stored reference trajectory signal value while the sample trajectory signal is obtained which establishes an aggregate error. The algorithm continues processing sample trajectory signal data against the stored reference data as long as the correlation algorithm can maintain a continuously low aggregate error. If the aggregate error calculated by the correlation algorithm exceeds a predetermined threshold error level, the processor 40 will terminate the detection algorithm, and provide a negative verification signal. If however, the statistical correlation algorithm can maintain a continuously low aggregate error level from beginning to end of the sample trajectory signal, the processor 40 will produce a positive verification signal indicating that the same fingertip produced both the sample trajectory signal and the reference trajectory signal.

The method of detection and verification further comprises a technique for normalizing the sample trajectory signal. It will be apparent to one skilled in the art that normalizing the sample trajectory signal reduces the complexity of the device by providing a continuously optimized number of sampled data points. The normalization technique is achieved by standardizing the optimal number of data points required, and providing an initial sampling rate. Upon detecting a sample trajectory signal, the processing algorithm calculates the sample trajectory signal frequency. It will be apparent to one skilled in the art that the sampling rate must be corrected by the processing algorithm in direct proportion to the sample trajectory signal frequency. Therefore, an increase in fingertip velocity across the sensing array 20 will cause a proportional increase in the sampling rate. Likewise, a decrease in fingertip velocity will cause a proportional decrease in the sampling rate. The normalization process further simplifies the disclosed invention by constantly providing an optimized number of data points, and further providing a fingerprint detection and verification method that becomes independent of the fingertip velocity. The reduced number of sampled data points facilitates implementation of a lower cost processing circuit, as well as a smaller amount of required memory and power to drive the circuit. The preferred embodiment of the present invention is not dependent upon a memory 48 for storing the reference trajectory signal. Storage of the reference trajectory signal within the data carrier card 50 is an optional feature. Another embodiment of the current invention is a method by which the reference trajectory signal is provided to the processor 40 through a data interface 54. This embodiment allows the reference signal used by the correlation algorithm to be stored by the verifying agency, rather than storing the reference signal within the data carrier card 50. This feature serves to eliminate the element of fraud caused by a user carrying a counterfeit data carrier card 50. This feature would be especially useful to institutions such as, but not limited to, banks, health care facilities, and government agencies, that require the identification of a limited but known group of individuals. Where identification for security purposes allows a lower probability of absolute identification, data carrier card 50 may embody a credit card issued by a bank with the owner's reference trajectory signal pre-programmed within the memory 48. A credit card of this type could be presented by the owner when purchasing goods at retail establishments as a means for correctly identifying the card holder by verifying the fingerprint information at the point of sale terminal as a condition of the sale. The use of a data carrier card 50 which requires the user to verify their fingerprint prior to completing a sales transaction will significantly lower the occurrence of credit card fraud.

The unique features of the present invention allow a low cost fingerprint detector 10 to be implemented into a single integrated circuit package 70 which has a small overall size and low profile, further enabling the fingerprint detector 10 to be fabricated into a data carrier card 50, or other suitable device. These packages will be resistant to the harsh environments that human interfacing will produce. The unique skin resistance sensing array 20 has several advantages over existing technology which requires thermal or optical fingerprint detection schemes. The sensor produces an electronic waveform that may be processed by a relatively simple algorithm implemented using existing technology based upon the probability that any two fingerprints producing the same electronic signal is de minimis. Previously disclosed methods do not involve the technique of moving or swiping the fingertip relative to a sensing array, thereby producing a continuous electronic trajectory signal representing the fingerprint topography. Previously disclosed approaches further fail to provide a low cost sensing array for sensing electrical conductance changes of the varying resistance of ridges and valleys of a fingertip and translating this resistance characteristic of skin into an electrical signal.

Although the invention has been described with particular reference to certain preferred embodiments thereof, variations and modifications can be effected within the spirit and scope of the following claims.

What is claimed is:

1. A fingerprint detector comprising:

sensing array means for translating a skin resistance of a fingertip into a sample trajectory signal as the fingertip is moved relative to the sensing array means, said sample trajectory signal being produced by a curvilinear trajectory formed by ridges and valleys of the fingertip and representing electrical conductance changes in the skin resistance of the fingertip associated with a profile of its ridges and valleys, said sensing array means including at least one sensor positioned for contacting the fingertip and allowing relative movement between the fingertip and the sensor, said sensor producing said sample trajectory signal corresponding to the skin resistance of the ridges and valleys as the fingertip and the sensing array means are moved relative to one another;

sampling means, coupled to said sensing array means, for quantizing said sample trajectory signal; and processing means, coupled to said sampling means, for comparing said sample trajectory signal with a reference trajectory signal and producing a verification signal related to a probability that the fingertip generated both the sample trajectory signal and the reference trajectory signal.

2. The detector of claim 1 wherein the sensing array means comprises:

an insulating layer having a first side and a second side;

a conducting layer formed on said first side of said insulating layer having an outer surface opposed to said first side, said conducting layer having a plurality of holes therein for exposing said insulating layer;

an array of conducting wires extending through said holes and being generally flush with the top surface of said conducting layer; and means for coupling said array of conducting wires to said sampling means.

3. The detector of claim 2 wherein said sensing array means forms a voltage divider when a fingerprint ridge completes a circuit by simultaneously contacting said conducting layer and a conducting wire within said array of conducting wires.

4. The detector of claim 2 wherein said array of conducting wires is embedded into an insulating layer of a single integrated circuit package.

5. The detector of claim 2 wherein said array of conducting wires forms an n×m array, with said processor measuring a velocity function over a known distance when a fingertip and the sensing array means are moved relative to one another.

6. The detector of claim 2 wherein said conducting wire is small enough in diameter for forming an open circuit when a fingertip valley is passed over said conducting wire.

7. The detector of claim 2 wherein said sampling means comprises:

a multiplexer for selectively sequencing through a plurality of said conducting wires; and an analog to digital converter for generating a digital bit stream representing said sample trajectory signal.

8. The detector of claim 1 wherein said sensing array means, said sampling means, and said processing means are fabricated within a single integrated circuit package.

9. The detector of claim 1 which further comprises memory means for storing said reference trajectory signal.

10. The detector of claim 1 wherein said sensing array means is located on a data carrier card at a location to permit a finger to be swiped across said sensing array means to produce said sample trajectory signal.

11. The detector of claim 1 wherein said fingerprint detector further comprises means for being activated automatically upon sensing relative contact between a finger and said sensing array means.

12. The detector of claim 1 wherein said fingerprint detector further comprises means for interfacing with an external storage device.

13. A fingerprint detector comprising:

(a) a skin resistance sensing array for contacting a fingertip and translating a skin resistance of ridges and valleys of the fingertip into a sample trajectory signal as the fingertip and the skin resistance sensing array are moved relative to one another, said sample trajectory signal being produced by a curvilinear trajectory formed by ridges and valleys of the fingertip and representing electrical conductance changes in the skin resistance of the fingertip associated with a profile of its ridges and valleys with respect to time, said skin resistance sensing array including:

(i) an insulating layer having a first side and a second side;

(ii) a conducting layer formed on said first side of said insulating layer having a top surface opposed to said first side, said conducting layer having a plurality of holes for exposing said insulating layer;

(iii) an array of conducting wires extending from said second side of said insulating layer and through said holes, each conducting wire being centered within each said hole; and said array of conducting wires being flushly aligned with the top surface of said conducting layer;

(b) a multiplexer coupled to said skin resistance sensing array for selectively switching between each conducting wire of said skin resistance sensing array;

(c) an analog to digital converter coupled to said multiplexer for generating a digital bit stream representing said sample trajectory signal; and (d) a processor coupled to said analog to digital converter for comparing said sample trajectory signal with a reference trajectory signal and producing a verification signal related to a probability that the fingertip generated both the sample trajectory signal and the reference trajectory signal.

14. The device of claim 13 wherein said processor is coupled to a storage device, said storage device storing at least one reference trajectory signal.

15. The device of claim 14 wherein said storage device is a random access memory (RAM).

16. The device of claim 14 wherein said storage device is a read only memory (ROM).

17. A method for detecting and verifying a fingerprint, said method comprising the steps of:

providing a skin resistance sensing array;

moving a fingertip relative to the skin resistance sensing array, said skin resistance sensing array translating skin resistance of a fingertip into a sample trajectory signal, said sample trajectory signal being produced by a curvilinear trajectory formed by ridges and valleys of the fingertip and representing electrical conductance changes in the skin resistance of the fingertip associated with a profile of its ridges and valleys;

correlating said sample trajectory signal with a reference trajectory signal; and producing a verification signal related to the probability that the fingertip generated both the sample trajectory signal and the reference trajectory signal.

18. The method of claim 17 which further comprises the step of:

quantizing the samples trajectory signal into a digital bit stream.

19. The method of claim 17 which further comprises:

mounting an array of conducting wires in a surface of a data carrier card;

swiping the fingertip across the array of conducting wires;

normalizing the sample trajectory signal;

comparing the normalized sample trajectory signal with the stored reference trajectory signal; and producing a verification signal.

20. The method of claim 19 wherein said normalizing step is carried out by:

standardizing an optimal number of data points to be sampled during one sample trajectory signal period;

providing an initial sampling rate;

measuring a sample trajectory signal frequency;

correcting said sampling rate by a constant multiplier directly related to said sample trajectory signal frequency; and continuously adjusting said sampling rate to acquire said corrected sampling rate, whereby the normalization serves to standardize for fluctuations between fingertip swiping velocity rates.

* * * * *